(12) United States Patent
Gunter

(10) Patent No.: US 7,083,241 B2
(45) Date of Patent: Aug. 1, 2006

(54) TRACK TENSIONER FOR A WHEEL-DRIVEN SKID STEER

(76) Inventor: Herbert D. Gunter, 5885 E. State Rd. 114, North Manchester, IN (US) 46942

( * ) Notice: Subject to any disclaimer, the term of this patent is extended or adjusted under 35 U.S.C. 154(b) by 0 days.

(21) Appl. No.: 10/888,390

(22) Filed: Jul. 9, 2004

(65) Prior Publication Data

US 2005/0061411 A1 Mar. 24, 2005

Related U.S. Application Data

(60) Provisional application No. 60/500,925, filed on Sep. 8, 2003.

(51) Int. Cl.
*B62D 55/104* (2006.01)
(52) U.S. Cl. .................. 305/20; 305/141; 180/9.21
(58) Field of Classification Search .................. 305/15, 305/20, 124, 139, 141, 143, 145, 148, 150, 305/134, 135, 151; 180/9.21
See application file for complete search history.

(56) References Cited

U.S. PATENT DOCUMENTS

| | | | | |
|---|---|---|---|---|
| 1,463,728 A | * | 7/1923 | Sinclair | 180/9.62 |
| 1,568,241 A | * | 1/1926 | Emile | 305/132 |
| 2,584,512 A | * | 2/1952 | Strait | 305/20 |
| 2,609,195 A | * | 9/1952 | Drakeley et al. | 267/64.15 |
| 2,719,062 A | * | 9/1955 | Arps | 305/154 |
| 3,183,987 A | | 5/1965 | Trombley | |
| 3,447,620 A | | 6/1969 | Schoonoverr | |
| 3,447,621 A | | 6/1969 | Schoonover | |
| 3,533,482 A | | 10/1970 | Cushman | |
| 3,603,423 A | * | 9/1971 | Schoonover | 180/24.11 |
| 3,610,356 A | | 10/1971 | Byar, Jr. | |
| 3,692,132 A | * | 9/1972 | Pollanen | 180/193 |
| 3,744,857 A | * | 7/1973 | Schoonover | 305/145 |
| 4,620,602 A | * | 11/1986 | Capriotti | 180/9.21 |
| 6,224,172 B1 | * | 5/2001 | Goodwin | 305/145 |
| 6,447,077 B1 | | 9/2002 | Durick et al. | |
| 6,615,939 B1 | | 9/2003 | Karales et al. | |
| 2004/0119336 A1 | * | 6/2004 | Lussier | 305/145 |

FOREIGN PATENT DOCUMENTS

JP 55-39837 * 3/1980

* cited by examiner

Primary Examiner—Russell D. Stormer
(74) Attorney, Agent, or Firm—Barnes & Thornburg LLP

(57) ABSTRACT

A track tensioner for a drive track of a work machine includes biasing element configured to urge an idler wheel into contact with the drive track. The biasing element may include an air spring.

16 Claims, 4 Drawing Sheets

US 7,083,241 B2

TRACK TENSIONER FOR A WHEEL-DRIVEN SKID STEER

This application claims priority to U.S. Provisional Patent Application Ser. No. 60/500,925 entitled "Track Tensioning Device for Multi-Axle Equipment" which was filed on Sep. 8, 2003 by Herbert D. Gunter, the entirety of which is expressly incorporated by reference herein.

FIELD OF THE DISCLOSURE

The present disclosure relates generally to work machines, and more particularly to endless drive tracks and track tensioners for work machines.

BACKGROUND

A wheel-driven skid steer may be used to perform a number of tasks at a variety of work sites. In certain operating conditions, it may be desirable to install an endless drive track over the front and rear tires of the wheel-driven skid steer to facilitate operation thereof. For example, a drive track may be used to facilitate operation of the wheel-driven skid steer in muddy conditions.

SUMMARY

According to one aspect of the disclosure, a track tensioner for a work machine includes an air spring that is configured to assert a bias on an idler wheel. The idler wheel tensions the work machine's drive track.

In another aspect of the disclosure, a skid steer includes a drive track advanced around the front and rear tires of the skid steer. An idler wheel of a track tensioner is urged into contact with an outer, ground-engaging surface of the drive track by a biasing element. In an exemplary implementation, the biasing element is embodied as a spring. In another exemplary implementation, the biasing element is embodied as an air spring.

In another aspect of the disclosure, a retrofit kit for a wheel-driven skid steer includes a drive track and a track tensioner. The track tensioner includes an idler wheel which is urged into contact with the drive track by a spring when the drive track and the track tensioner are installed on the skid steer.

The above and other features of the present disclosure will become apparent from the following description and the attached drawings.

BRIEF DESCRIPTION OF THE DRAWINGS

The detailed description particularly refers to the accompanying figures in which.

DETAILED DESCRIPTION OF THE DRAWINGS

Figure 1:
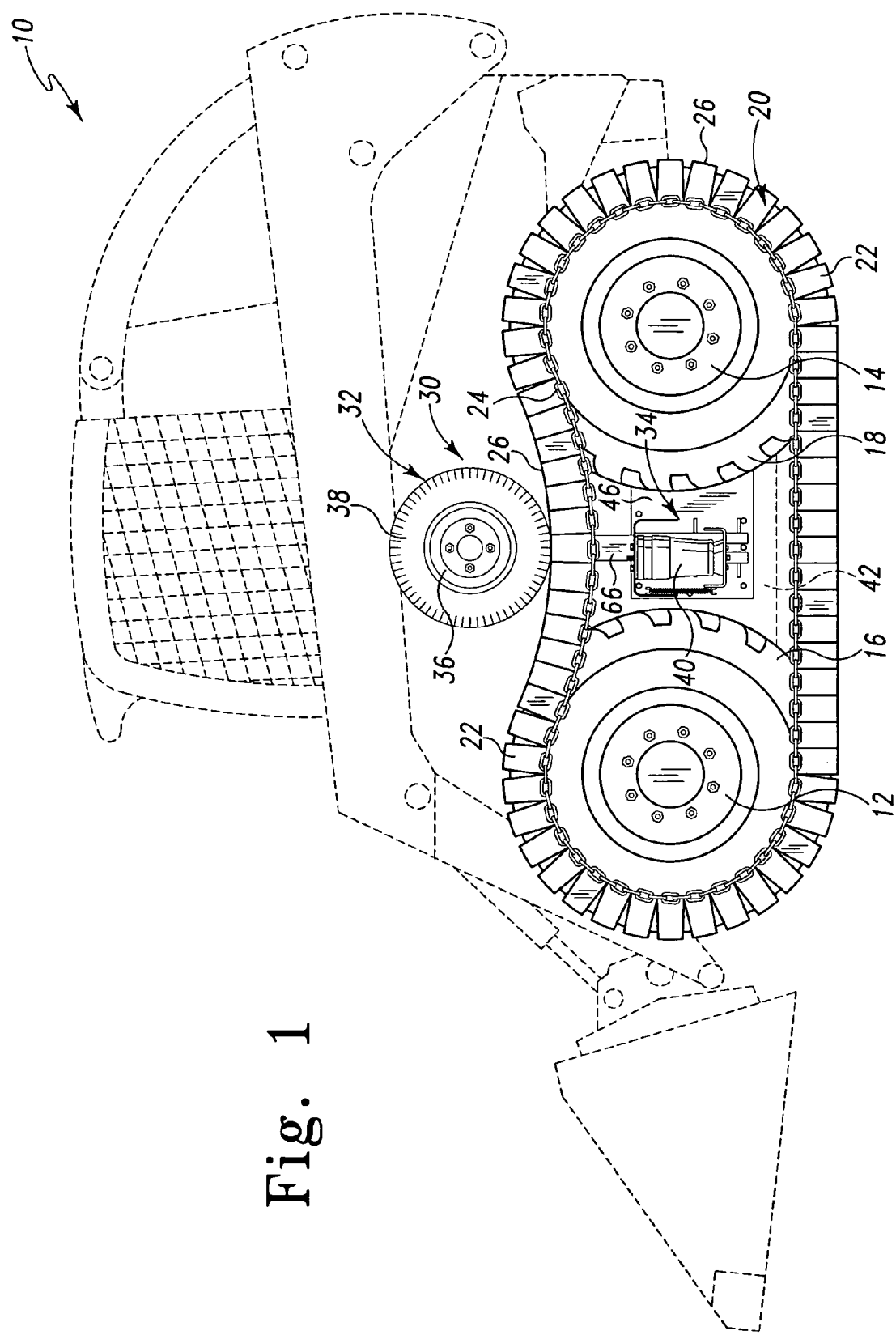
FIG. 1 is a diagrammatic view of a wheel-driven skid steer.

Referring now to FIG. 1, there is shown a work machine such as a wheel-driven skid steer 10 which is utilized to perform numerous work functions such as earth moving and material loading. As used herein, the term "wheel-driven" is intended to mean that the skid steer is propelled by a drive system which includes a pair of front wheels (and tires) and a pair of rear wheels (and tires). In particular, mechanical output from an engine (not shown) is transmitted to one or both of the front wheels 12 and the rear wheels 14 via a transmission assembly (not shown) thereby driving the wheels and hence the skid steer 10. As such, "wheel-driven" skid steers are contrasted from "belt-driven" skid steers which include an undercarriage assembly that includes a drive sprocket that is driven by the output from the engine to drive, for example, a rubber drive belt.

As shown in FIG. 1, each of the front wheels 12 of the wheel-driven skid steer 10 has a tire 16 mounted thereon, whereas each of the rear wheels 14 has a tire 18 mounted thereon. The wheel-driven skid steer 10 may be retrofit with an endless drive track 20 to facilitate operation of the skid steer in certain conditions (e.g., muddy conditions). As shown in FIG. 1, such a retrofit drive track 20 is advanced around the front tires 16 and the rear tires 18. In the exemplary embodiment described herein, the drive track 20 includes a number of pads 22 which are secured together with an endless chain 24. The drive track 20 includes an outer, ground-engaging surface 26 which is opposite to the inner surface which contacts the tires 16, 18.

The wheel-driven skid steer 10 may also be retrofit with a track tensioner 30 to tension the drive track 20. The track tensioner 30 includes an idler wheel 32 which is urged into contact with the outer, ground engaging surface 26 of the drive track 20 by a biasing element 34. In the exemplary embodiment described herein, the idler wheel 32 is embodied as a rim 36 having a rubber tire 38 secured thereto. However, the idler wheel 32 may be embodied as any number of different wheels or rollers. For example, the idler wheel 32 may be embodied as one or more plastic rollers.

The biasing element 34 may be embodied as any number of different devices for generating a bias which is transmitted to the idler wheel 32. For example, the biasing element 34 may be embodied as a counterweight, pneumatic/hydraulic cylinder, or a coiled spring. In the exemplary embodiment described herein, the biasing element 34 is embodied as an air spring 40. One commercially available air spring that may be used as the air spring 40 is a Model No. 9000 Air Spring which is commercially available from Firestone Industrial Products of Carmel, Ind.

Figure 2:
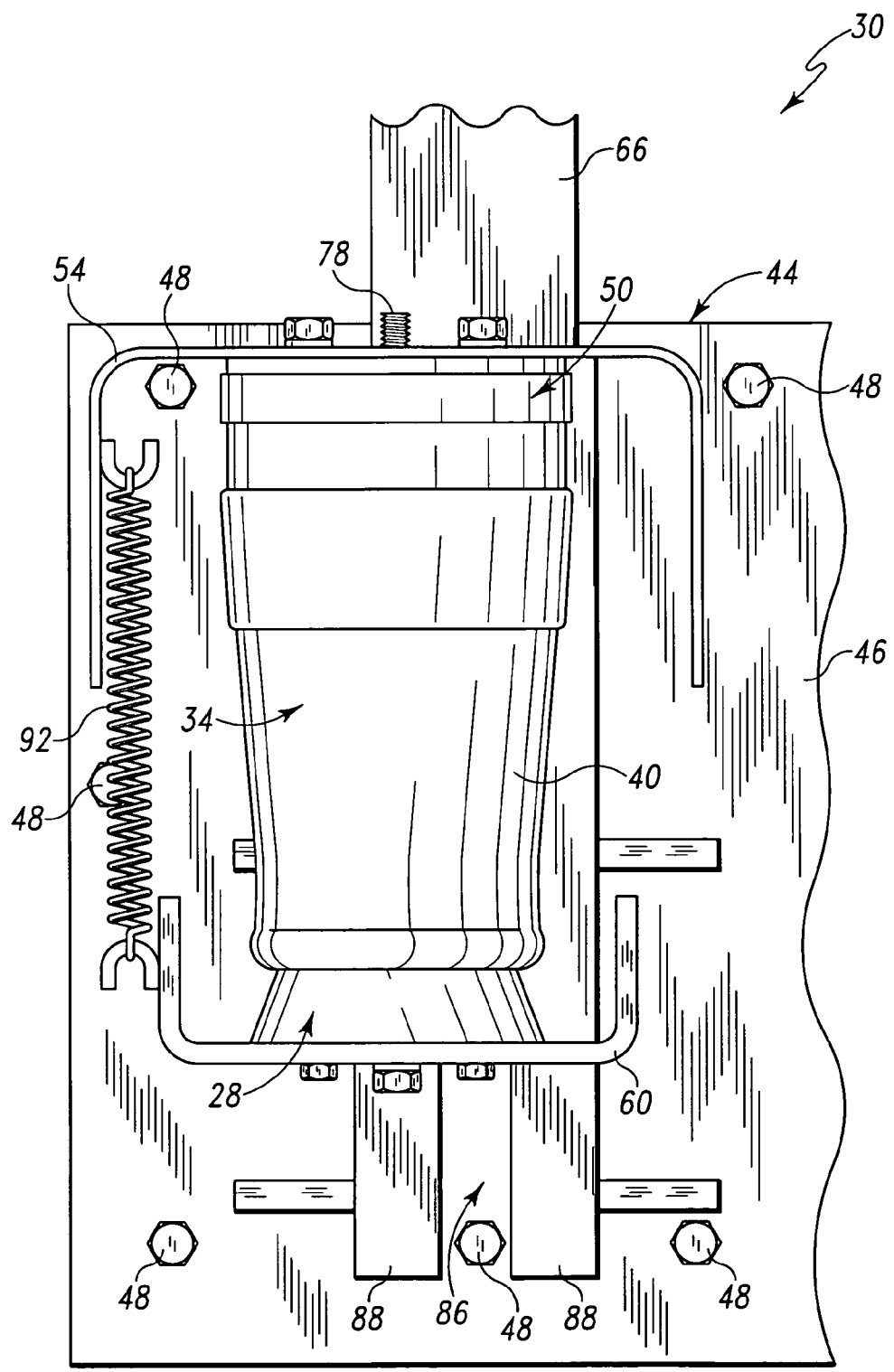
FIG. 2 is a fragmentary elevational view of a track tensioner for use with the skid steer of FIG. 1.

As shown in FIG. 2, the air spring 40 includes an air inlet 78. An air hose from an air compressor (not shown) or other pressurized air source may be coupled to the inlet 78 to charge the air spring 40 to a desired pressure. The air spring 40 may be operated at any desirable pneumatic pressure to fit the needs of given design of the track tensioner 30 and/or the skid steer 10. For example, the air spring 40 may be operated at about 30 psi. Moreover, an onboard compressor (not shown) may be used to supply air pressure to the air spring 40.

One end of the air spring 40 is configured to be secured to a portion of the body 42 of the wheel-driven skid steer 10, with the other end of the air spring 40 being coupled to the idler wheel 32. For example, the track tensioner 30 includes a mounting assembly 44 which bolts to, or is otherwise secured to, the machine body 42 of the wheel-driven skid steer 10. The mounting assembly 44 is configured to maintain one end of the air spring 40 stationary relative to the body 42 of the skid steer 10, while allowing the other end of the air spring 40 to move relative to the body 42 of the skid steer 10. The movable end of the air spring 40 is coupled to the idler wheel 32. What is meant herein by the term "body" as used in conjunction with the skid steer 10 is any portion of the skid steer's chassis, frame, side panel, or other structural member of the skid steer.

Figure 3:
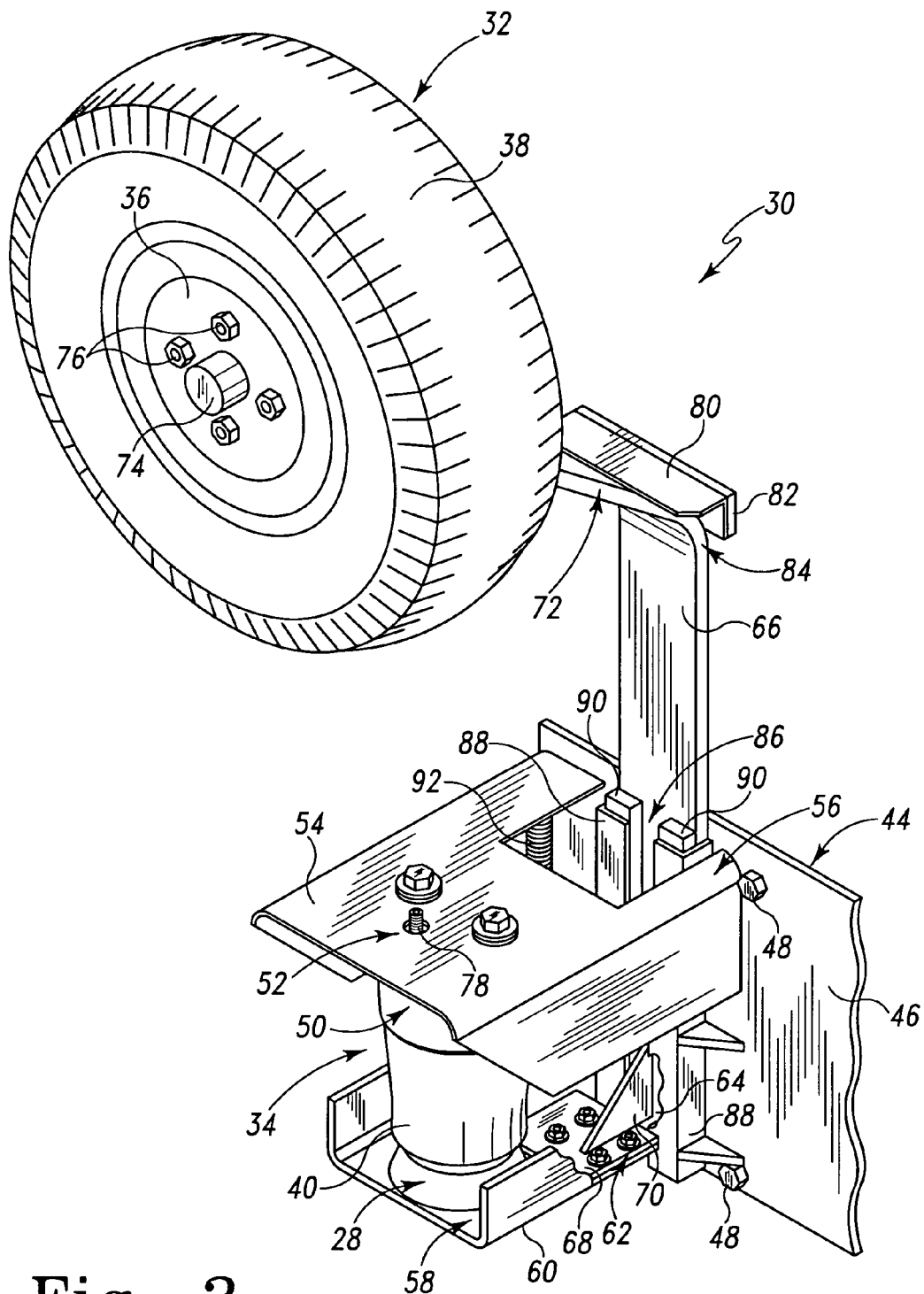
FIG. 3 is fragmentary perspective view of the track tensioner of FIG. 2, note that a portion of the lower bracket and one of the guide rails has been cut away for clarity of description.
Figure 4:
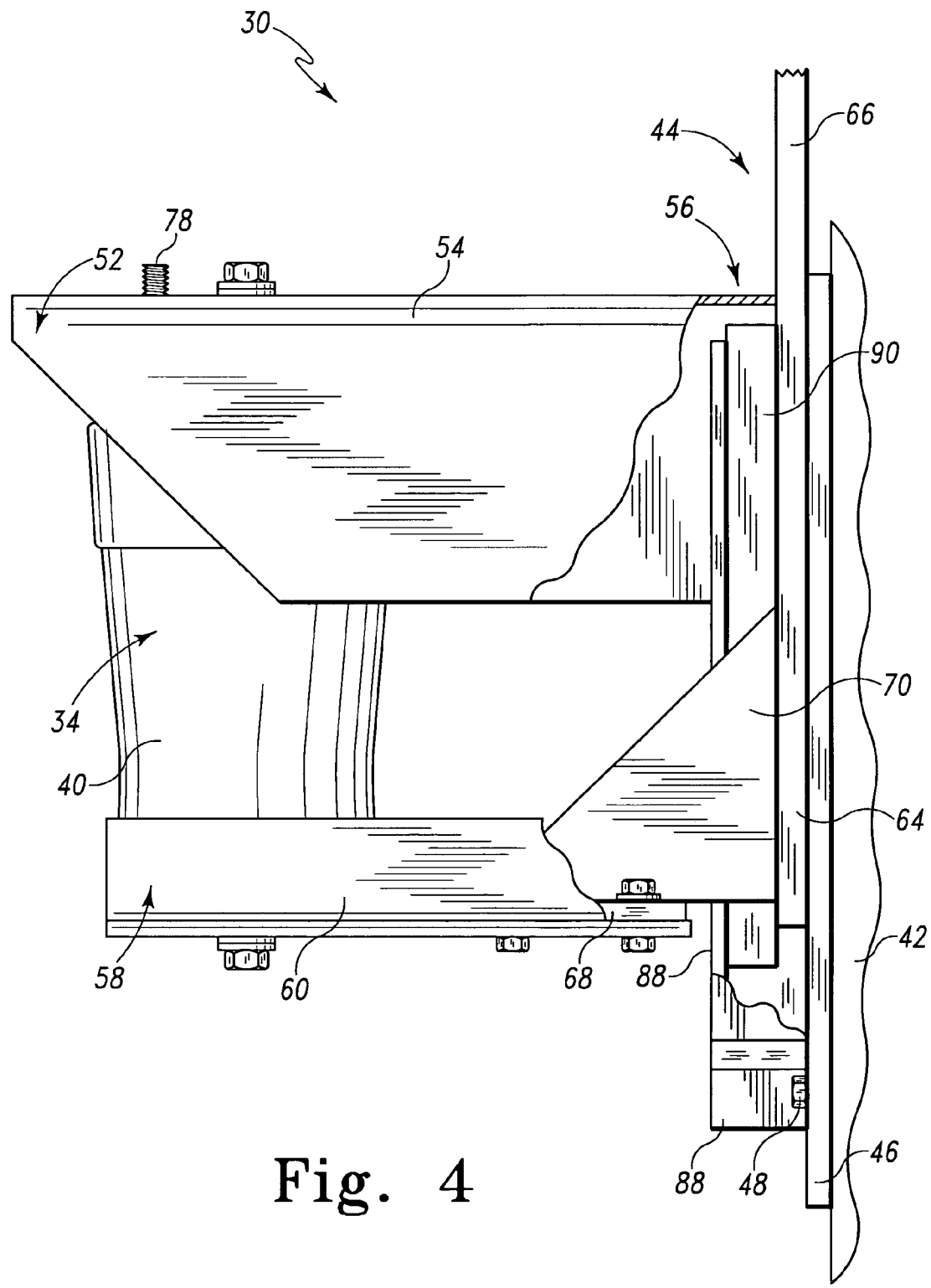
FIG. 4 is a side elevational view of the track tensioner of FIG. 2, note that a portion the upper bracket, the lower bracket, and one of the guide rails has been cut away for clarity of description.

As shown in more detail in FIGS. 2–4, the mounting assembly 44 of the track tensioner 30 includes a mounting plate 46 that may be secured to the body 42 of the skid steer 10 by the use of a number of bolts 48. The upper end 50 (as viewed in the orientation of FIGS. 2–4) of the air spring 40 is bolted or otherwise secured to one end 52 of a mounting bracket 54. The other end 56 of the upper mounting bracket 54 is welded or otherwise secured to the mounting plate 46. As such, when the track tensioner 30 is installed on the wheel-driven skid steer 10, the upper end 50 of the air spring 40 is held stationary relative to the body of the skid steer 10.

The lower end 28 of the air spring 40 is movable relative to the stationary, upper end 50 of the air spring 40. One end 58 of a bracket 60 is bolted or otherwise secured to the lower end 28 of the air spring 40. The other end 62 of the bracket 60 is secured to one end 64 of an idler support arm 66. Specifically, a support plate 68 is bolted or otherwise secured to the end 62 of the lower bracket 60. A gusset 70 is welded or otherwise secured to both the support plate 68 and the lower end 64 of the idler support arm 66. As such, upward and downward movement of the lower bracket 60 causes corresponding upward and downward movement of the idler support arm 66.

As shown in FIG. 3, the idler wheel 32 is coupled to the upper end 72 of the idler support arm 66. Specifically, a wheel hub 74 is rotatably coupled to the upper end 72 of the idler support arm 66. The rim 36 is secured to the wheel hub 74 by the use of a number of lug nuts 76. As such, the idler wheel 32 is free to rotate relative to the idler support arm 66.

As shown in FIG. 3, the idler support arm 66 has a wear plate 80 secured thereto. The wear plate 80 has a plastic bushing 82 secured thereto which contacts the outer surface of the body 42 of the skid steer 10. The bushing 82 may be made out of any type of plastic such as Ultra-High Molecular Weight Polyethylene (UHMWPE). The wear plate 80 is located proximate to a bend 84 in the idler support arm 66.

As shown in FIGS. 2–4, the mounting plate 46 has a guide channel 86 defined by a pair of spaced apart guide rails 88. The lower end 64 of idler support arm 66 is positioned in the guide channel 86. As such, the lower end 64 of the idler support arm 66 translates upwardly and downwardly within the channel 86 in response to movement of the air spring 40. Each of the guide rails 88 of the guide channel 86 has a plastic liner 90 secured thereto. The plastic liner 90 may be made out of any type of plastic such as UHMWPE, and reduces wear of the idler support arm 66 and the guide rails 88.

The track tensioner 30 also includes a coiled spring 92 (see FIG. 2). A first end of the coiled spring 92 is clipped or otherwise secured to the upper bracket 54, with the opposite end of the coiled spring 92 being clipped or otherwise secured to the lower bracket 60. The spring 92 facilitates installation or removal of the drive track 20. Specifically, when air pressure is removed from the air spring 40, the coiled spring 92 recoils thereby urging the lower bracket 60 toward the upper bracket 54 thereby raising the idler wheel 32. Such raising of the idler wheel 32 creates the necessary clearance to install or remove the drive track 20. When the air spring 40 is charged (i.e., pressurized), the air spring overcomes the spring bias of the coiled spring 92 thereby urging the lower bracket 60 away from the upper bracket 54 thereby lowering the idler wheel 32.

In operation, the track tensioner 30 tensions the drive track 20. Specifically, the air spring 40 generates a force which urges the lower bracket 60 in a direction away from the upper bracket 54. As a result, the idler support arm 66 is urged downwardly (as viewed in the orientation of FIG. 1) thereby urging the tire 38 into contact with the outer, ground-engaging surface 26 of the drive track 20 to tension the drive track 20.

If during advancement of the skid steer 10, a rock or the like is ingested by the drive track 20 (e.g., captured between the drive track 20 and one of the tires 18, 20), tension in the drive track 20 may become greater than the pneumatic pressure in the air spring 40. In such a case, the idler wheel 32 is urged upwardly thereby increasing pneumatic pressure within the air spring 40. Once the rock has been expelled (or the tension in the drive track 20 otherwise removed), the bias generated by the air spring 40 again urges the idler wheel 32 downwardly such that the tire 38 contacts the outer, ground-engaging surface 26 of the drive track 20 to tension the drive track 20.

It should be appreciated that the drive track 20 and the track tensioner 30 may be provided as a retrofit kit for wheel-driven skid steers. Indeed, a retrofit kit including a drive track 20 and a track tensioner 30 may be installed on each side of the skid steer. In such a way, the skid steer may be operated in conditions that may otherwise prevent its use (e.g., muddy conditions).

It should also be appreciated that although the idler wheel 32 is herein described as urging downwardly on the outer, ground-engaging surface 26 of the drive track 20 to tension the drive track 20, other configurations are also contemplated. For example, the track tensioner 30 may be configured such that the idler wheel 32 urges upwardly on the inner surface of the drive track 20 (i.e., the surface which contacts the tires 16, 18).

Yet further, it should also be appreciated that although the upper bracket 54 is herein described as being stationary (relative to the body 42 of the skid steer 10) with the lower bracket 60 being movable relative to the body 42 of the skid steer 10 (and coupled to the idler wheel 32), the position of the two brackets may be swapped. Specifically, the track tensioner 30 may be configured such that the upper bracket is movable relative to the body 42 of the skid steer 10 (and coupled to the idler wheel 32), with the lower bracket being stationary relative to the body 42 of the skid steer.

While the disclosure is susceptible to various modifications and alternative forms, specific exemplary embodiments thereof have been shown by way of example in the drawings and has herein be described in detail. It should be understood, however, that there is no intent to limit the disclosure to the particular forms disclosed, but on the contrary, the intention is to cover all modifications, equivalents, and alternatives falling within the spirit and scope of the invention as defined by the appended claims.

There are a plurality of advantages of the present disclosure arising from the various features of the apparatus and methods described herein. It will be noted that alternative embodiments of the apparatus and methods of the present disclosure may not include all of the features described yet still benefit from at least some of the advantages of such features. Those of ordinary skill in the art may readily devise their own implementations of an apparatus and method that incorporate one or more of the features of the present disclosure and fall within the spirit and scope of the present disclosure.

The invention claimed is:

1. A track tensioner for tensioning a drive track of a work machine, the track tensioner comprising:
   an air spring having (i) a first end tat is configured to be secured to a body of the work machine, and (ii) a second end tat is movable relative to the first end,
   an idler support arm secured to the second end of the air spring, and
   an idler wheel secured to the idler support arm and positioned above the air spring, and
   further comprising a mounting plate, a first bracket, and a second bracket, wherein:
   the mounting plate is configured to be secured to the body of the work machine,
   a first end of the first bracket is secured to the mounting plate,
   a second end of the first bracket is secured to the first end of the air spring,
   a first end of the second bracket is secured to the second end of the air spring, and
   a second end of the second bracket is secured to the idler support arm.

2. The track tensioner of claim 1, wherein:
   the drive track comprises an outer, ground-engaging surface, and the idler wheel is positioned to contact the outer, ground-engaging surface of the drive track.

3. The track tensioner of claim 1, further comprising a coiled spring having (i) a first end secured to the first bracket, and (ii) a second end secured to the second bracket.

4. The track tensioner of claim 1, wherein:
   the mounting plate has a guide channel, and
   the idler support arm is positioned in the guide channel.

5. The track tensioner of claim 1, wherein the idler wheel comprises (i) a rim which rotates relative to the idler support arm, and (ii) a rubber tire secured to the rim.

6. A wheel-driven skid steer, comprising:
   a front tire,
   a rear tire,
   a drive track advanced around the front tire and the rear tire, the drive track having an outer, ground-engaging surface,
   an idler wheel,
   an idler support arm configured to position the idler wheel in contact with the outer, ground-engaging surface of the drive track, and
   a biasing element configured to exert a bias on the idler support arm to urge the idler wheel into contact with the outer, ground-engaging surface of the drive track, wherein the idler wheel is positioned above the biasing element, and
   further comprising a mounting plate having a guide channel, wherein the idler support arm is positioned in the guide channel.

7. The skid steer of claim 6, further comprising a machine body, wherein the biasing element comprises an air spring having (i) a first end secured to the machine body, and (ii) a second end secured to the idler support arm.

8. The skid steer of claim 7, further comprising:
   a first bracket having (i) a first end secured to the first end of the air spring, and (ii) a second end which is secured to the machine body, and
   a second bracket having (i) a first end secured to the second end of the air spring, and (ii) a second end secured to the idler support arm.

9. The skid steer of claim 8, further comprising a coiled spring having (i) a first end secured to the first bracket, and (ii) a second end secured to the second bracket.

10. The skid steer of claim 6, wherein the idler wheel comprises (i) a rim which rotates relative to the idler support arm, and (ii) a rubber tire secured to the rim.

11. The skid steer of claim 6, further comprising a machine body, wherein the biasing element comprises a spring having (i) a first end secured to the machine body, and (ii) a second end secured to the idler support arm.

12. A retrofit kit for a wheel-driven skid steer, the retrofit kit comprising:
   a drive track configured to be advanced around a front tire and a rear tire of the wheel-driven skid steer when installed on the wheel-driven skid steer, and
   a track tensioner configured to tension the drive track when installed on the wheel-driven skid steer, track tensioner comprising: (i) a spring having a first end and a second end which is movable relative to the first end, (ii) an idler support arm secured to the second end of the spring, and (iii) an idler wheel secured to the idler support arm and positioned above the spring, and
   wherein the track tensioner further comprises a mounting plate configured to be secured to a body of the wheel-driven skid steer, a first bracket having (i) a first end secured to the first end of the air spring, and (ii) a second end secured to the mounting plate, and a second bracket having (i) a first end secured to the second end of the air spring, and (ii) a second end secured to the idler support arm, and
   wherein the spring comprises an air spring.

13. The retrofit kit of claim 12, wherein:
   the drive track comprises an outer, ground-engaging surface, and
   the idler wheel is positioned to contact the outer, ground-engaging surface of the drive track when both the drive track and the track tensioner are installed on the wheel-driven skid steer.

14. The retrofit kit of claim 12, wherein the track tensioner further comprises a coiled spring having (i) a first end secured to the first bracket, and (ii) a second end secured to the second bracket.

15. The retrofit kit of claim 12 wherein:
   the mounting plate has a guide channel, and
   the idler support arm is positioned in the guide channel.

16. The retrofit kit of claim 12, wherein the idler wheel of the track tensioner comprises (i) a rim which rotates relative to the idler support arm, and (ii) a rubber tire secured to the rim.

* * * * *